United States Patent
Nica

(10) Patent No.: US 7,606,827 B2
(45) Date of Patent: Oct. 20, 2009

(54) QUERY OPTIMIZATION USING MATERIALIZED VIEWS IN DATABASE MANAGEMENT SYSTEMS

(75) Inventor: Anisoara Nica, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 258 days.

(21) Appl. No.: 11/638,411

(22) Filed: Dec. 14, 2006

(65) Prior Publication Data

US 2008/0147598 A1   Jun. 19, 2008

(51) Int. Cl.
*G06F 17/30* (2006.01)
(52) U.S. Cl. .......................... 707/102; 707/3
(58) Field of Classification Search ............. 707/1–6, 707/102
See application file for complete search history.

(56) References Cited

U.S. PATENT DOCUMENTS

| | | | |
|---|---|---|---|
| 6,356,890 B1 * | 3/2002 | Agrawal et al. | 707/2 |
| 7,139,783 B2 * | 11/2006 | Hinshaw et al. | 707/205 |
| 2005/0125398 A1 * | 6/2005 | Das et al. | 707/4 |
| 2006/0224564 A1 * | 10/2006 | Yu et al. | 707/2 |
| 2008/0071785 A1 * | 3/2008 | Kabra et al. | 707/9 |

OTHER PUBLICATIONS

A.Y.Halevy, "Answering Queries Using Views: A Survey," Dept. of Computer Science and Engineering, *The FLDB Journal*, 10:270-294, 2001.

* cited by examiner

*Primary Examiner*—Diane Mizrahi
(74) *Attorney, Agent, or Firm*—Sterne, Kessler, Goldstein & Fox P.L.L.C.

(57) ABSTRACT

Systems, methods and computer program products for optimization of query evaluation using materialized views in a database management system (DBMS) are described herein. During a pre-optimization phase, building blocks are generated that can be used to generate valid partial execution plans, where at least one of the building blocks can be a materialized view. During an enumeration phase, a plurality of execution plans for the query are generated using the building blocks. Some of the execution plans may include materialized views.

17 Claims, 11 Drawing Sheets

802

QUERY OPTIMIZATION USING MATERIALIZED VIEWS IN DATABASE MANAGEMENT SYSTEMS

BACKGROUND OF THE INVENTION

1. Field of the Invention

The present invention is generally directed to optimizers in database management systems, and more particularly directed to the use of materialized views to optimize evaluation of queries.

2. Background Art

A query optimizer is a component of a database management system that attempts to determine the most efficient way to execute a query. If properly designed and implemented, query optimizers can significantly increase the efficiency of DBMS query processing.

Some database management systems support materialized views. As is well known, it is sometimes advantageous to access materialized views, instead of base tables. Traditionally, however, materialized views have not been used to assist with the evaluation of queries. Accordingly, there is a need for improved techniques in query optimizers for optimizing evaluation of queries using materialized views.

BRIEF SUMMARY OF THE INVENTION

The present invention is directed to systems, methods and computer program products for optimization of query evaluation using materialized views in a database management system (DBMS).

Briefly stated, an embodiment of the invention determines building blocks that can be used to generate valid partial execution plans. Such determination includes consideration of materialized views. Thus, the building blocks may include materialized views. This occurs during a pre-optimization phase. A given materialized view is determined to be a building block if two necessary conditions hold: (a) predicates of the materialized view are less restrictive than predicates of the query, and (b) tables of the materialized view are a subset of tables of the query.

During an enumeration phase, a plurality of execution plans for the query are generated using the building blocks generated during the pre-optimization phase. Some of the execution plans may include materialized views. Such operation is achieved by building access plans, which are later used to generate the execution plans.

According to an embodiment, during enumeration, a base table is added to an access plan if a materialized view having a view of the table is not already represented in the access plan. A materialized view is added to the access plan if the access plan does not already contain any table referenced by the materialized view. In other words, when a table is added to an access plan, any materialized views that reference the table are removed from further consideration for addition to the access plan. When a materialized view is added to the access plan, the tables that are referenced by the materialized view are removed from further consideration for addition to the access plan.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
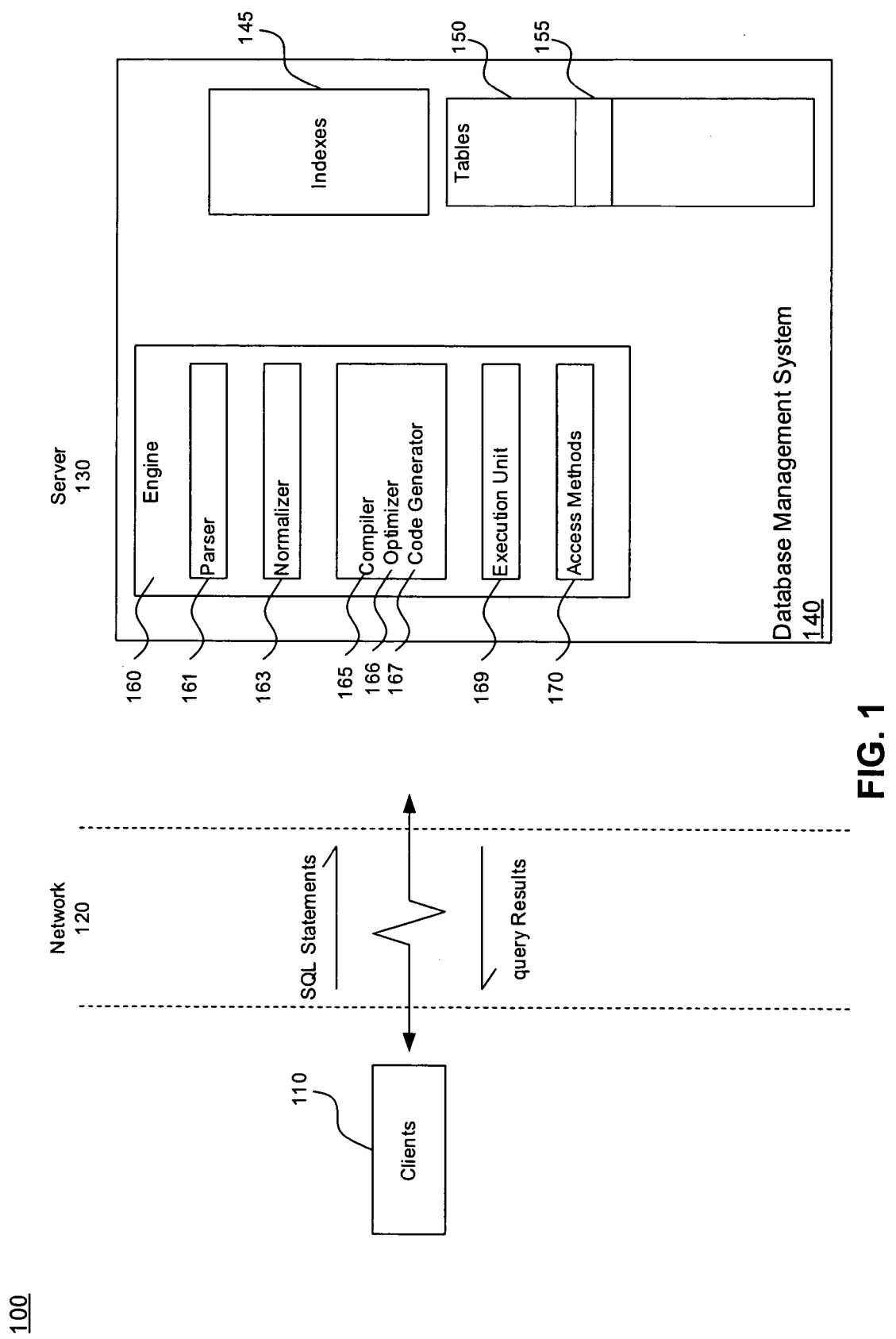
FIG. 1 illustrates a DMBS environment according to an embodiment of the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview of the Invention

The present invention is directed to systems, methods and computer program products for query evaluation optimization using materialized views in a database management system (DBMS).

As is well known, a view is a virtual or logical table composed of the result set of a query. The data shown in a view changes when the data in the corresponding base tables change. Views provide a number of advantages over tables, such as the ability to subset data contained in a table, and to provide a single virtual view of multiple tables.

Some database management systems support materialized views. With materialized views, the query result is stored as an actual table (as opposed to a virtual table) that is infrequently updated from the original base tables. Materialized views enable more efficient access, at the cost of data sometimes being potentially out-of-date.

Views and materialized views are well known in database theory, and are described in a number of publicly available documents, such as Alon Y. Halevy, "Answering Queries Using Views: A Survey," VLDB Journal, Vol. 10, No. 4, pages 270-294, 2001, available at:

{http://link.springer.de/link/service/journals/00778/bibs/1010004/10100270.htm},bibsource = {DBLP, http://dblp.uni-trier.de}

This document is herein incorporated by reference in its entirety.

According to the present invention, query evaluation is optimized by using materialized views. More particularly, embodiments of the invention enumerate through a plurality of execution plans when evaluating a query. Some of the execution plans may involve base tables, others may involve materialized views, and still others may involve both base tables and materialized views. A cost is assigned to each execution plan, and then the execution plan with the lowest cost is executed. According to the invention, the execution plan that is executed may involve base tables and/or materialized views.

The invention shall now be described in greater detail with reference to FIG. 1, which illustrates an example client/server database system 100 according to an embodiment of the present invention. As shown, the system 100 comprises one or more clients 110 in communication with a server 130 via a network 120. A database management system (DBMS) 140 resides in the server 130.

In operation, clients 110 send data in, or retrieve data from, database tables 150 by issuing SQL statements to DBMS 140. SQL (Structured Query Language) is well known and is described in many publicly available documents, including "Information Technology—Database languages—SQL," published by the American National Standards Institute as American National Standard ANSI/ISO/IEC 9075: 1992, which is hereby incorporated by reference in its entirety.

The SQL statements received from clients 110 are processed by engine 160 of the DBMS 140. The engine 160 comprises parser 161, normalizer 163, compiler 165, execution unit 169 and access methods 170.

SQL statements received from clients 110 are passed to the parser 161 which converts the statements into a query tree, which is a binary tree data structure that represents the components of the query in a format selected for the convenience of the system. In this regard, the parser 161 employs well known parsing methodology (e.g., recursive descent parsing).

The query tree is normalized by the normalizer 163. Normalization includes, for example, the elimination of redundant operations. Additionally, the normalizer 163 performs error checking, such as confirming that table names and column names which appear in the query are valid (e.g., are available and belong together). Finally, the normalizer may also look up any referential integrity constraints which exist and add those to the query.

After normalization, the query tree is passed to the compiler 165, which includes a query optimizer 166 and a code generator 167. The optimizer 166 is responsible for finding a query execution plan (QEP) for evaluating a query. The QEP is an operator tree whose nodes are physical algebraic operators. The optimizer 166 generates a set of QEPs that produce the correct result for a given query. The goal of the optimizer 166 is to select from this set the "best" QEP for the query, where "best" is measured according to implementation specific criteria. For example, the optimizer 166 may employ a cost-based analysis that involves assigning a cost to each QEP. The QEP having the lowest cost is selected for evaluating the query. The selected QEP is execution by execution unit 169, where such execution involves invoking particular access methods 170.

Figure 3:
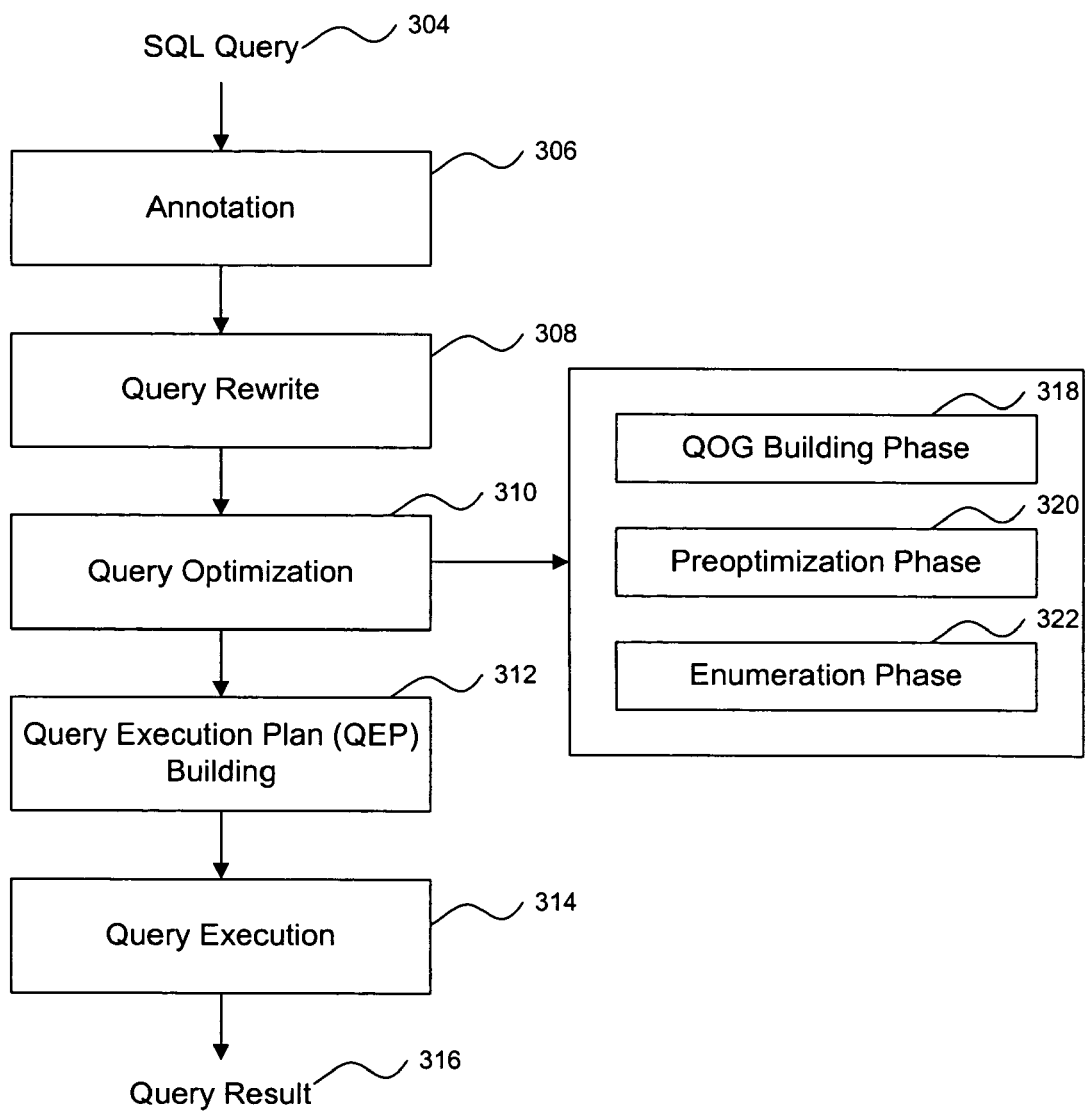
FIG. 3 illustrates a process for DBMS query processing according to an embodiment of the invention.

According to the invention, operation of the optimizer 166 is represented by a query optimization phase 310, which is part of a query processing process 302 shown in FIG. 3. In addition to the query optimization phase 310, the query processing process 302 includes an annotation phase 306, query rewrite phase 308, query execution plan (QEP) building phase 312 and query building phase 314. These phases 306, 308, 312 and 314 are well known, and shall not be described here.

The query optimization phase 310 is also generally well known, although it has been modified to perform the functions described herein. According to embodiments of the invention, such modifications are made so that they are transparent to the other phases 306, 308, 312 and 314 of the query processing process 302. Accordingly, changes to these other phases 306, 308, 312 and 314 according to embodiments of the invention are not necessary.

The query optimization phase 310 includes a QOG building phase 318, pre-optimization phase 320 and enumeration phase 322, which are all generally well known. However, according to embodiments of the invention, the pre-optimization phase 320 and enumeration phase 322 are modified to operate with materialized views. The pre-optimization phase 320 and enumeration phase 322 are described in detail below. It is noted, however, that such description and accompanying figures represent just one embodiment of the invention to enable query optimization using materialized views. The functionality described herein for optimizing query evaluation using materialized views may be achieved during other phases and/or by other components, as will be appreciated by persons skilled in the relevant art(s) based on the teachings contained herein.

2. Example Computer Implementation

Figure 2:
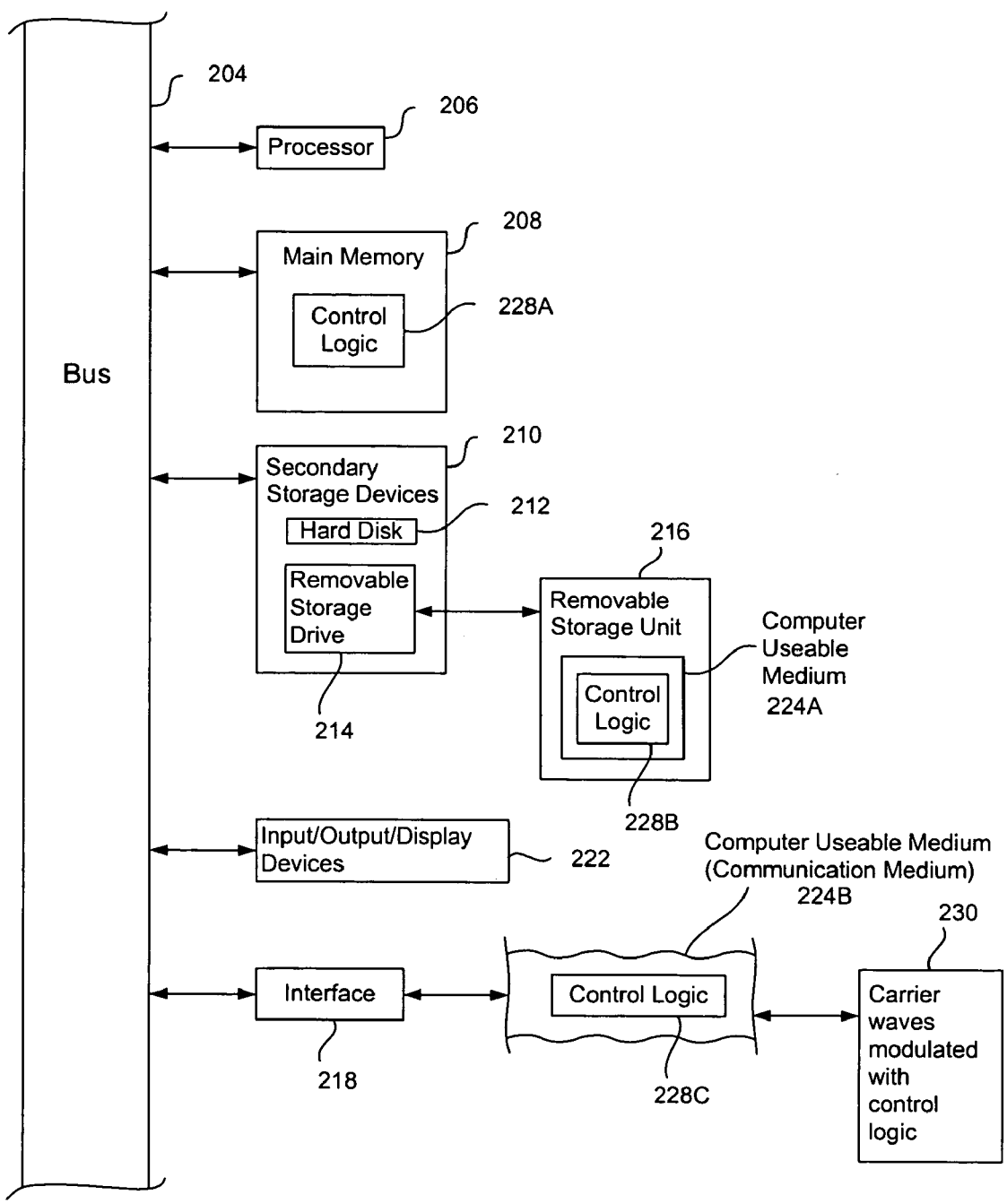
FIG. 2 illustrates an example computer system useful for implementing components of the invention.

In an embodiment of the present invention, the system and components of the present invention described herein are implemented using well known computers, such as computer 202 shown in FIG. 2. For example, clients 110 and server 130 can be implemented using computers 202.

The computer 202 can be any commercially available and well known computer capable of performing the functions described herein, such as computers available from International Business Machines, Apple, Sun, HP, Dell, Compaq, Digital, Cray, etc.

The computer 202 includes one or more processors (also called central processing units, or CPUs), such as a processor 206. The processor 206 is connected to a communication bus 204.

The computer 202 also includes a main or primary memory 208, such as random access memory (RAM). The primary memory 208 has stored therein control logic 228A (computer software), and data.

The computer 202 also includes one or more secondary storage devices 210. The secondary storage devices 210 include, for example, a hard disk drive 212 and/or a removable storage device or drive 214, as well as other types of storage devices, such as memory cards and memory sticks. The removable storage drive 214 represents a floppy disk drive, a magnetic tape drive, a compact disk drive, an optical storage device, tape backup, etc.

The removable storage drive 214 interacts with a removable storage unit 216. The removable storage unit 216 includes a computer useable or readable storage medium 224 having stored therein computer software 228B (control logic) and/or data. Removable storage unit 216 represents a floppy disk, magnetic tape, compact disk, DVD, optical storage disk, or any other computer data storage device. The removable storage drive 214 reads from and/or writes to the removable storage unit 216 in a well known manner.

The computer 202 also includes input/output/display devices 222, such as monitors, keyboards, pointing devices, etc.

The computer 202 further includes a communication or network interface 218. The network interface 218 enables the computer 202 to communicate with remote devices. For example, the network interface 218 allows the computer 202 to communicate over communication networks or mediums 224B (representing a form of a computer useable or readable medium), such as LANs, WANs, the Internet, etc. The network interface 218 may interface with remote sites or networks via wired or wireless connections.

Control logic 228C may be transmitted to and from the computer 202 via the communication medium 224B. More particularly, the computer 202 may receive and transmit carrier waves (electromagnetic signals) modulated with control logic 230 via the communication medium 224B.

Any apparatus or manufacture comprising a computer useable or readable medium having control logic (software) stored therein is referred to herein as a computer program product or program storage device. This includes, but is not limited to, the computer 202, the main memory 208, the secondary storage devices 210, the removable storage unit 216 and the carrier waves modulated with control logic 230. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

3. Pre-Optimization Phase of Query Optimization

Modifications to the pre-optimization phase 320 to enable query evaluation optimization using materialized views shall now be described.

Figure 4:
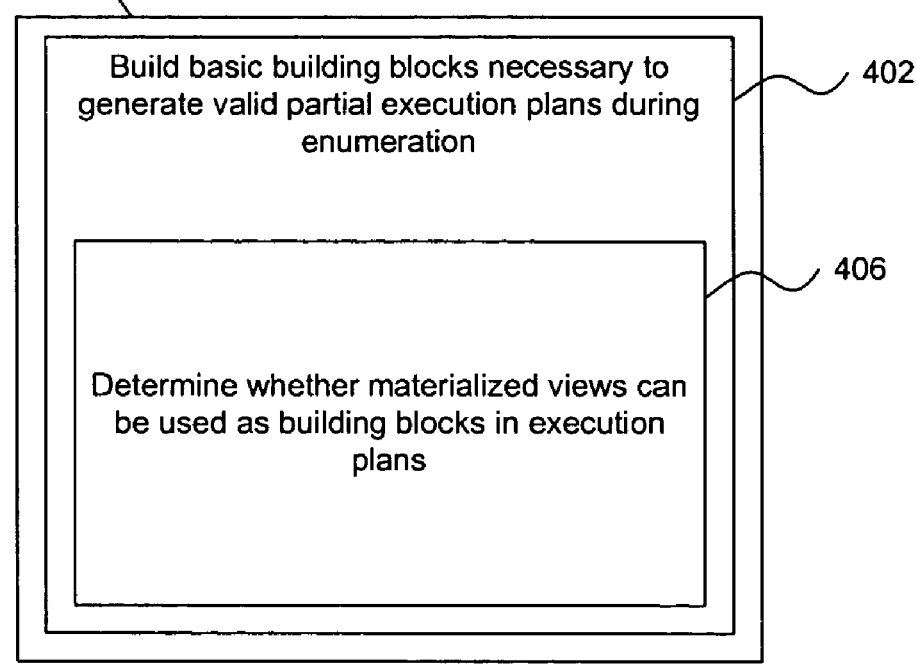
FIG. 4 illustrates a pre-optimization phase that has been modified to accommodate materialized views according to an embodiment of the invention.

During the pre-optimization phase 320, the optimizer 166 builds the basic building blocks necessary to generate valid partial execution plans during enumeration, based on the current schema and the query semantics (see step 402 of FIG. 4). Such building blocks may include, for example, index methods, join methods, predicate equivalence classes and subquery access methods. A superset of building blocks are built during this phase, although many will not be used in the 'best' execution plan.

Figure 6:
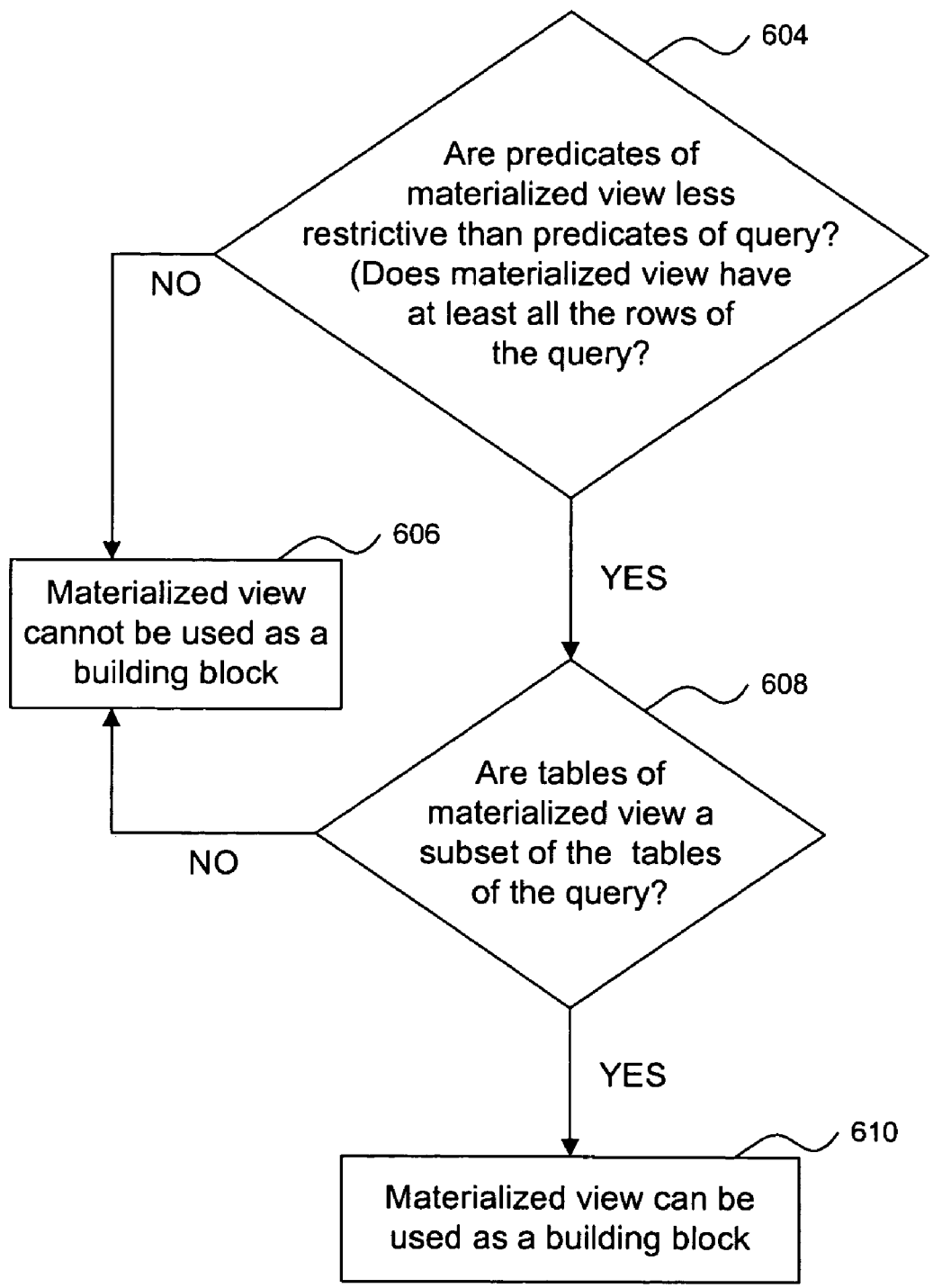
FIG. 6 illustrates a process for determining whether a materialized view can be used as a building block to generate valid partial execution plans during enumeration, according to an embodiment of the invention.

According to embodiments of the invention, such building blocks may include materialized views. Accordingly, during the pre-optimization phase 320, the optimizer 166 determines whether any materialized views can be used as building blocks (step 406 of FIG. 4). The operation of step 406 is illustrated in flowchart 602 of FIG. 6, which shall now be described.

In step 604, the optimizer 166 determines whether the materialized view being considered (called the "candidate materialized view") contains a super set of the rows needed in the query block (such operation is sometimes called view matching). This is done by checking predicate subsumption. More particularly, in step 604, the optimizer 166 determines whether the predicates of the candidate materialized view are less restrictive than the predicates of the query. If the predicates of the candidate materialized view are less restrictive than those of the query, then the candidate materialized view contains at least the rows needed in the query block. Accordingly, the optimizer 166 proceeds to step 608 for further processing of the candidate materialized view. Otherwise, the optimizer 166 determines that the candidate materialized view cannot be used as a building block (step 606).

Figure 7:
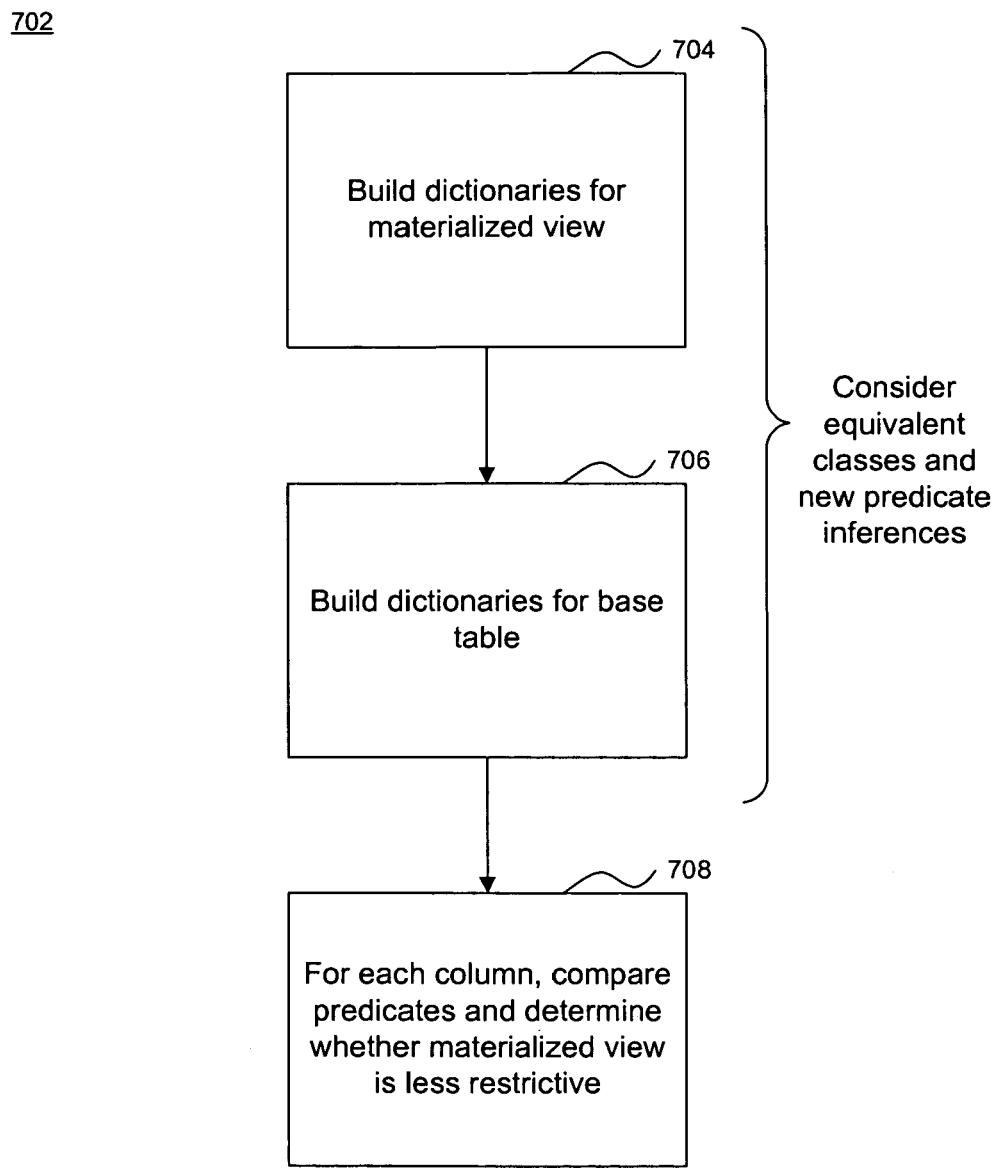
FIG. 7 illustrates a process for determining whether a candidate materialized view contains a super set of the rows needed in a query block, using materialized view and base table dictionaries, according to an embodiment of the invention.

As shown in the flowchart 702 of FIG. 7, in an embodiment of the invention, the optimizer 166 performs step 604 by building one or more dictionaries for the candidate materialized view (step 704) and a dictionary for each base table referenced by the query (step 706). In an embodiment, the dictionaries are built just once for each query and the materialized view and reused when a new candidate materialized view is matched against the same query, or when the materialized view is matched against a different query during its pre-optimization phase. The materialized view dictionaries record the predicates used in the candidate materialized view. At least one such dictionary is built for predicates that have to be matched exactly in the query and at least one dictionary is built for predicates that may subsume predicates in the query (i.e., predicates that are less restrictive than the predicates of the query). Similarly, the base table dictionary records the predicates associated with each column of a given base table referenced by the query. The optimizer 166 references these dictionaries when determining whether the predicates of the candidate materialized view are less restrictive than the predicates of the query (step 604). In particular, the optimizer 166 performs step 604 by, for each column, accessing the materialized view and base table dictionaries to determine the respective predicates for the column, and then comparing those predicates (step 708 of FIG. 7).

According to an embodiment of the invention, in building the materialized view and base table dictionaries (steps 704 and 706), the optimizer 166 considers equivalent classes and new predicate inferences. Equivalent class refers to expressions that are equated to one another in a WHERE clause. For example, if a query references column C1 and a candidate materialized view references column C2, and at some point C1 is equated with C2 in the query or the materialized view, then C1 and C2 form an equivalent class and such equivalency is reflected in the dictionaries.

New predicate inferences are also reflected in the dictionaries, according to an embodiment of the invention. For example, if C1 is equated with C2, and C2 is explicitly defined as being less than 10, then C1 is inferred to also be less than 10. Such predicate inference is reflected in the dictionaries of both the query and the materialized view.

Referring again to FIG. 6, in step 608, the optimizer 166 determines whether the tables of the candidate materialized view are a subset of the tables referenced by the query. If they are not, then the candidate materialized view cannot be used as a building block for evaluating the query (step 606), since using the materialized view for evaluation of the query would potentially yield an incorrect result set containing records not referenced by the query. If the tables of the candidate materialized view are a subset of the tables referenced by the query, then the optimizer 166 determines that the candidate materialized view can be used as a building block for generating valid partial execution plans during enumeration.

The pre-optimization phase finds all the candidate materialized views that can be used to answer parts of the same query. Many of these building blocks corresponding to the materialized views may not be used in the execution plan built for the query at the end of the enumeration phase, namely in phase 312.

4. Enumeration Phase of Query Optimization

Modifications to the enumeration phase 322 to enable query evaluation optimization using materialized views shall now be described.

Figure 5:
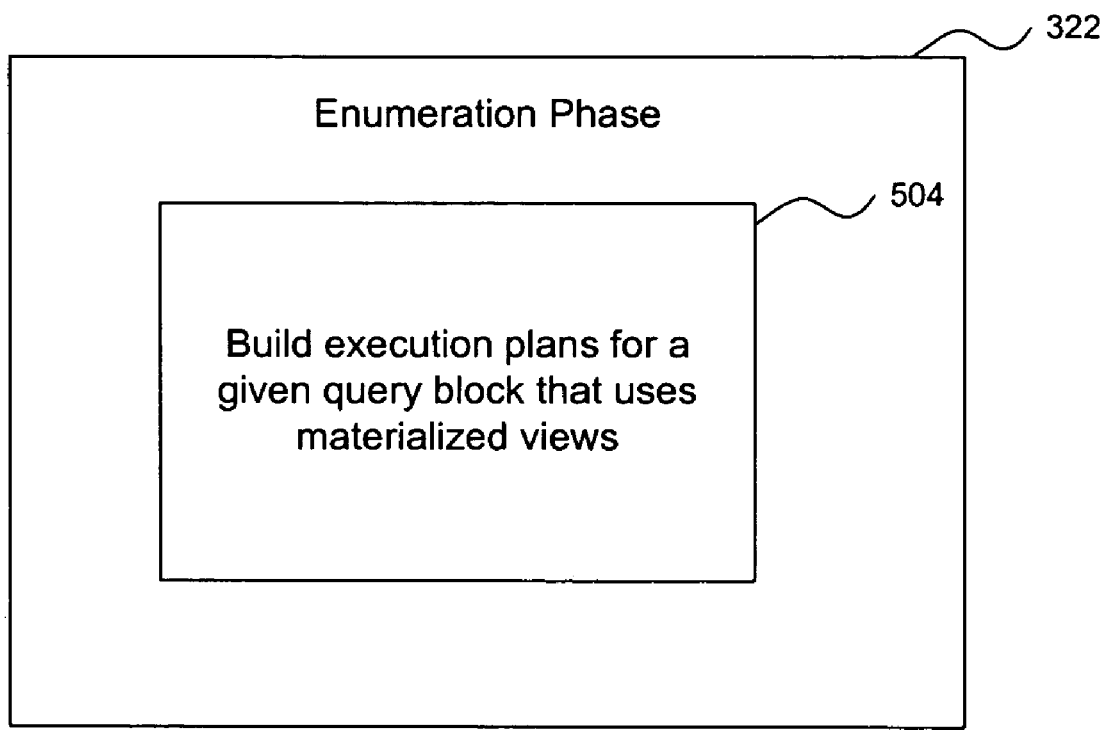
FIG. 5 illustrates an enumeration phase that has been modified to accommodate materialized views according to an embodiment of the invention.

During the enumeration phase 322, a search space generation algorithm in the optimizer 166 typically builds and examines thousands of execution plans. From among these execution plans, the optimizer 166 selects the "best" QEP for the query, where "best" is measured according to well known, implementation specific criteria. According to embodiments of the invention, such execution plans may include materialized views. Accordingly, during the enumeration phase 322, the optimizer 166 builds a large number of execution plans, any of which may include materialized views (step 504 in FIG. 5).

In order to build such execution plans, the invention may employ any well known search space generation algorithm that has been modified to accommodate materialized views. Consider the following example query:

```
Select * from
A, B, C, D, E
```

Figure 8:
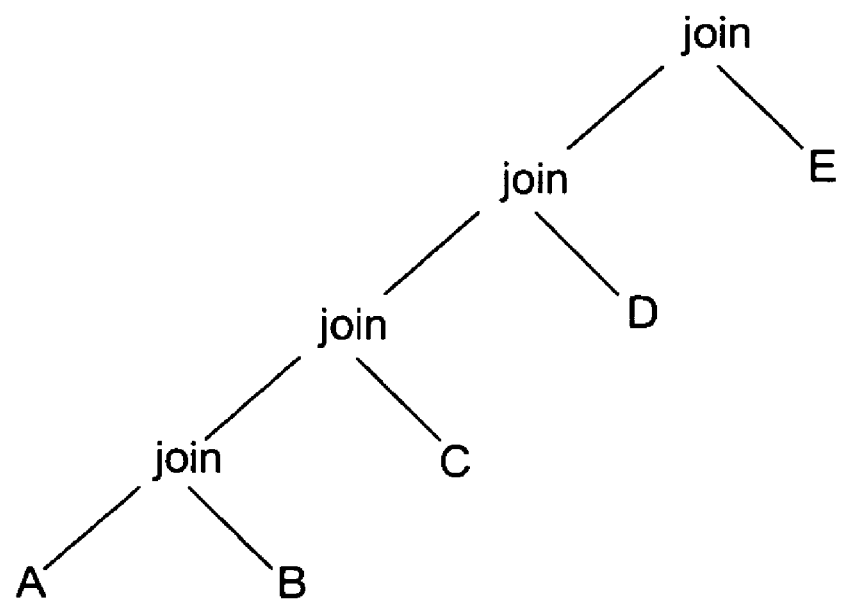
FIGS. 8-11 illustrate example access plans used to describe the operation of the enumeration phase, according to an embodiment of the invention.
Figure 9:
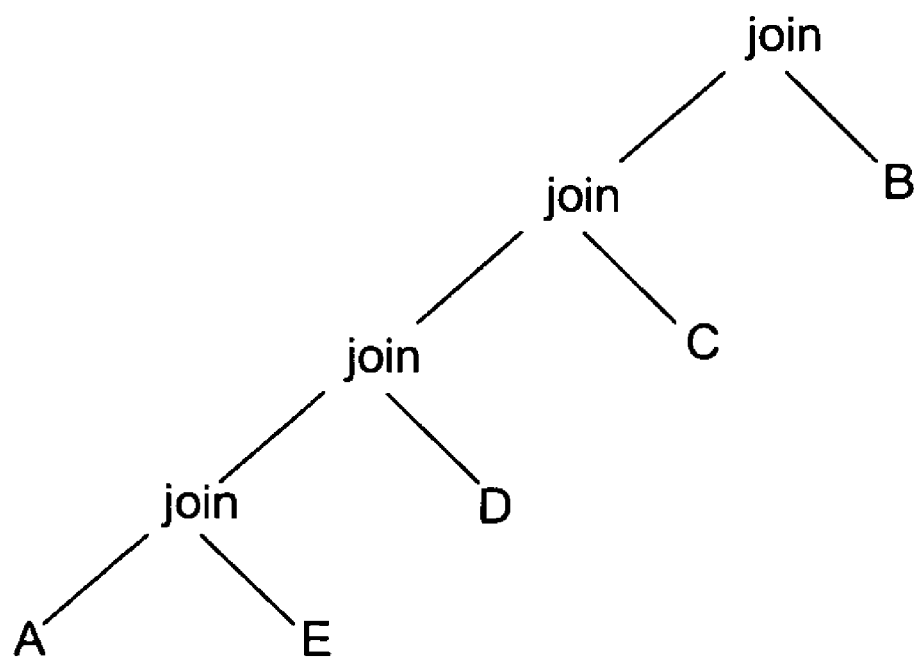

A conventional search space generation algorithm might generate access plans 802 and 902 shown in FIGS. 8 and 9. These access plans do not reference materialized views.

In order to accommodate materialized views, it is necessary to note that any given materialized view may be a view of multiple tables. Thus, according to embodiments of the invention, when a table is added to an access plan, any materialized view using that table should not also be placed in that particular access plan. Similarly, when a materialized view is added to an access plan, the tables referenced by that materialized view should not be individually placed in the rest of the access plan.

In other words, for any given access plan, there should be no overlap between materialized views and base tables referenced by those materialized views. Thus, a materialized view should be added to an access plan only if the tables referenced by that materialized view are not already placed in the access plan. Similarly, a table should be added to an access plan only if there are no materialized views already in the access plan that refers to the table.

Such operation of the present invention shall be illustrated by the following example. Consider again the following example query:

```
Select * from
A, B, C, D, E
```

Assume there are two materialized views, V1 and V2, where V1: {C, D, E} and V2: {B, C}. That is, the materialized view V1 is a view on tables C, D and E, and the materialized view V2 is a view on tables B and C.

Figure 10:
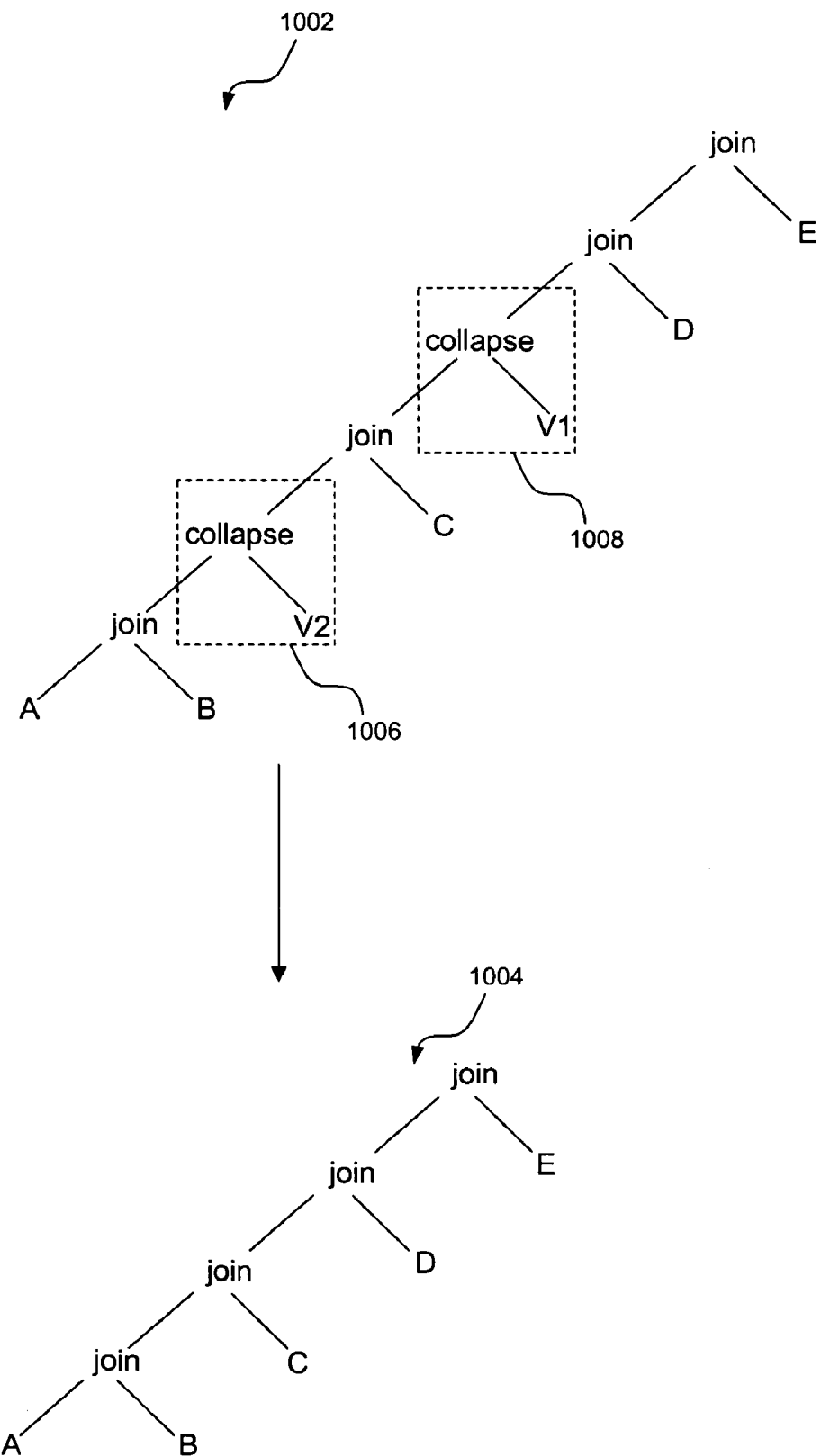

Consider the example access plan 1002 shown in FIG. 10. In this example, the search space generation algorithm begins building the access plan 1002 with tables A and then B. The materialized view V2 includes table B. Accordingly, the search space generation algorithm 'removes' V2 from further consideration. According to an embodiment of the invention, the search space generation algorithm accounts for V2 by inserting a collapse node 1006 right after the table B into the access plan 1002. The search space generation algorithm continues to build the access plan 1002 by adding table C. The materialized view V1 includes table C, so the search space generation algorithm accounts for V1 by inserting a collapse node 1008. The search space generation algorithm finishes building the access plan 1002 by adding the remaining tables D and E. Thereafter, if the best access plan found by the enumeration algorithm is the access plan 1002 then the execution plan 1004 will be built from the access plan 1002. The collapse nodes 1006 and 1008 were dropped from the execution plan 1004 to reflect the fact that the building blocks V1 and V2 are not used in the final execution plan 1004.

Figure 11:
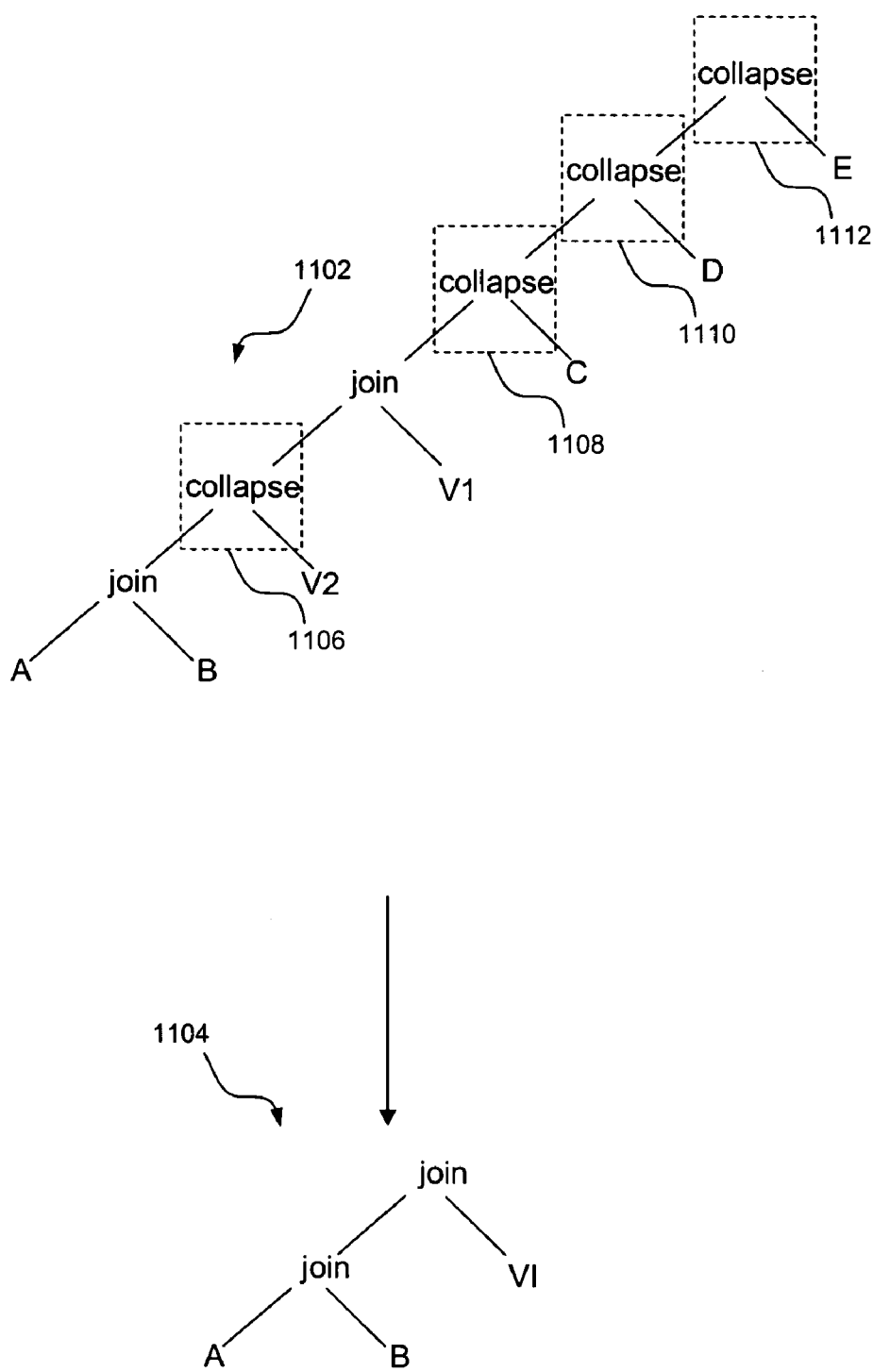

FIG. 11 illustrates another example access plan 1102, which is generated according to embodiments of the invention as follows. The search space generation algorithm begins with tables A and B in the access plan 1102. The materialized view V2 includes table B, so the search space generation algorithm accounts for V2 by inserting a collapse node 1106. The search space generation algorithm continues to build the access plan 1102 by adding next the materialized view V1. Recall that materialized view V1 is a view on tables C, D and E. Accordingly, it is not necessary to further reflect tables C, D and E in the access plan 1102. Therefore, collapse nodes 1108, 1110 and 1112 are added to access plan 1102. Thereafter, if the best access plan found by the join enumeration algorithm is the access plan 1102 then the execution plan 1104 will be built from it in phase 312. Again, the collapsed elements in the access plan 1102 are dropped when building the final execution plan 1104.

Implementation of the optimizer 166 wherein materialized views are accommodated during the enumeration phase 322 as just described will be apparent to persons skilled in the relevant arts.

5. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method of optimizing evaluation of queries in a database management system, comprising:

determining building blocks that can be used to generate valid partial execution plans, wherein at least one of said building blocks is a materialized view; and generating a plurality of execution plans for a query using said building blocks, wherein at least one of said execution plans includes a materialized view, wherein said generating step comprises:

adding a table to an access plan when said materialized view using said table is not already represented in said access plan; and adding said materialized view to said access plan when said access plan does not already contain any table referenced by said materialized view, wherein said determining, said generating and said adding steps are implemented on one or more processors.

2. The method of claim 1, wherein said determining step comprises:

determining that a candidate materialized view is a building block when (a) predicates of said candidate materialized view are less restrictive than predicates of said query, and (b) tables of said candidate materialized view are a subset of tables of said query.

3. The method of claim 2, further comprising:

generating at least one first dictionary that records predicates associated with said candidate materialized view;

generating a second dictionary that records predicates associated with each column of a given base table referenced by said query; and referencing said first and second dictionaries to determine whether predicates of said candidate materialized view are less restrictive than predicates of said query.

4. The method of claim 3, wherein at least one of equivalent classes and predicate inferences are used to generate said first and second dictionaries.

5. The method of claim 1, wherein said materialized view or said table is removed from further consideration for addition to said access plan by inserting a collapse node into said access plan.

6. A query optimizer executing in a database management system that optimizes evaluation of queries, comprising:

a pre-optimization phase module that determines building blocks that can be used to generate valid partial execution plans, wherein at least one of said building blocks is a materialized view; and an enumeration phase module that generates a plurality of execution plans for a query using said building blocks, wherein at least one of said execution plans includes a materialized view, wherein said enumeration phase module comprises:

a first adding module for adding a table to an access plan when said materialized view using said table is not already represented in said access plan; and a second adding module for adding said materialized view to said access plan when said access plan does not already contain any table referenced by said materialized view, wherein said pre-optimization phase module, said enumeration phase module, said first adding module and said second adding module are implemented on one or more processors.

7. The query optimizer of claim 6, wherein said pre-optimization phase module comprises:

means for determining that a candidate materialized view is a building block when (a) predicates of said candidate materialized view are less restrictive than predicates of said query, and (b) tables of said candidate materialized view are a subset of tables of said query.

8. The query optimizer of claim 7, further comprising:

means for generating a first dictionary that records predicates associated said candidate materialized view;

means for generating a second dictionary that records predicates associated with each column of a given base table referenced by said query; and means for referencing said first and second dictionaries to determine whether predicates of said candidate materialized view are less restrictive than predicates of said query.

9. The query optimizer of claim 8, wherein at least one of equivalent classes and predicate inferences are used to generate said first and second dictionaries.

10. The query optimizer of claim 6, wherein said materialized view or said table is removed from further consideration for addition to said access plan by inserting a collapse node into said access plan.

11. A computer program product comprising a tangible computer useable medium having computer program logic stored thereon for enabling a processor to optimize evaluation of database queries, said computer program logic comprising:

pre-optimization means for enabling said processor to determine building blocks that can be used to generate valid partial execution plans, wherein at least one of said building blocks is a materialized view; and enumeration means for enabling said processor to generate a plurality of execution plans for a query using said building blocks, wherein at least one of said execution plans includes a materialized view, wherein said enumeration means comprises:

first adding means for enabling said processor to add a table to an access plan when said materialized view using said table is not already represented in said access plan; and second adding means for enabling said processor to add said materialized view to said access plan when said access plan does not already contain any table referenced by said materialized view.

12. The computer program product of claim 11, wherein said pre-optimization means comprises:

means for enabling said processor to determine that a candidate materialized view is a building block when (a) predicates of said candidate materialized view are less restrictive than predicates of said query, and (b) tables of said candidate materialized view are a subset of tables of said query.

13. The computer program product of claim 12, said computer program logic further comprising:

means for enabling said processor to generate a first dictionary that records predicates associated with said candidate materialized view;

means for enabling said processor to generate a second dictionary that records predicates associated with each column of a given base table referenced by said query; and means for enabling said processor to reference said first and second dictionaries to determine whether predicates of said candidate materialized view are less restrictive than predicates of said query.

14. The computer program product of claim 13, wherein at least one of equivalent classes and predicate inferences are used to generate said first and second dictionaries.

15. The computer program product of claim 11, wherein said materialized view or said table is removed from further consideration for addition to said access plan by inserting a collapse node into said access plan.

16. A computer program product comprising a tangible computer useable medium having computer program logic stored thereon for enabling a processor to optimize evaluation of database queries, said computer program logic comprising:

pre-optimization means for enabling said processor to determine building blocks that can be used to generate valid partial execution plans, wherein at least one of said building blocks is a materialized view; and enumeration means for enabling said processor to generate a plurality of execution plans for a query using said building blocks, wherein at least one of said execution plans includes a materialized view, wherein said pre-optimization means comprises:

means for enabling said processor to determine that a candidate materialized view is a building block when (a) predicates of said candidate materialized view are less restrictive than predicates of said query, and (b) tables of said candidate materialized view are a subset of tables of said query;

wherein said computer program logic further comprises:

means for enabling said processor to generate a first dictionary that records predicates associated with said candidate materialized view;

means for enabling said processor to generate a second dictionary that records predicates associated with each column of a given base table referenced by said query; and means for enabling said processor to reference said first and second dictionaries to determine whether predicates of said candidate materialized view are less restrictive than predicates of said query.

17. A computer program product comprising a tangible computer useable medium having computer program logic stored thereon for enabling a processor to optimize evaluation of database queries, said computer program logic comprising:

pre-optimization means for enabling said processor to determine building blocks that can be used to generate valid partial execution plans, wherein at least one of said building blocks is a materialized view; and enumeration means for enabling said processor to generate a plurality of execution plans for a query using said building blocks, wherein at least one of said execution plans includes a materialized view, wherein said materialized view or a table is removed from further consideration for addition to said access plan by inserting a collapse node into said access plan.

* * * * *